(12) United States Patent
Wagner et al.

(10) Patent No.: US 12,037,279 B2
(45) Date of Patent: Jul. 16, 2024

(54) METHOD AND DEVICE FOR LASER-ASSISTED SEPARATION OF A PORTION FROM A SHEET GLASS ELEMENT

(71) Applicant: SCHOTT AG, Mainz (DE)

(72) Inventors: Fabian Wagner, Mainz (DE); Andreas Ortner, Gau-Algesheim (DE); Albrecht Seidl, Niedernberg (DE); Frank-Thomas Lentes, Bingen (DE); Jörn Gerban, Nieder-Olm (DE); Simon Schmitt, Wiesbaden (DE)

(73) Assignee: SCHOTT AG, Mainz (DE)

(*) Notice: Subject to any disclaimer, the term of this patent is extended or adjusted under 35 U.S.C. 154(b) by 0 days.

(21) Appl. No.: 18/150,122

(22) Filed: Jan. 4, 2023

(65) Prior Publication Data

US 2023/0141696 A1 May 11, 2023

Related U.S. Application Data (60) Division of application No. 15/871,716, filed on Jan. 15, 2018, now Pat. No. 11,572,301, which is a
(Continued)

(30) Foreign Application Priority Data

Jul. 15, 2015 (DE) .......................... 102015111490.9

(51) Int. Cl.
*C03B 33/09* (2006.01)
*B23K 26/53* (2014.01)
(Continued)

(52) U.S. Cl.
CPC ............ *C03B 33/091* (2013.01); *B23K 26/53* (2015.10); *C03B 33/0222* (2013.01); *C03B 33/04* (2013.01); *B23K 2103/54* (2018.08)

(58) Field of Classification Search
CPC ................................ B23K 26/50; C03B 33/09
See application file for complete search history.

(56) References Cited

U.S. PATENT DOCUMENTS

| 4,273,586 A | 6/1981 | Flannery |
| 4,285,728 A | 8/1981 | Babcock |
(Continued)

FOREIGN PATENT DOCUMENTS

| DE | 102012110971 | 5/2014 |
| DE | 102017101114 | 7/2017 |
(Continued)

OTHER PUBLICATIONS

English translation of International Search Report dated Sep. 23, 2016 for corresponding PCT/EP2016/066013.

*Primary Examiner* — Jodi C Franklin
(74) *Attorney, Agent, or Firm* — Ruggiero McAllister & McMahon LLC (57) ABSTRACT

A method for separating a portion from a sheet glass element having a thickness of at least 2 millimeters along an intended separation line that divides the sheet glass element into the portion and a remaining main part is provided. The method includes producing filamentary damages comprising sub-micrometer hollow channels in a volume of the glass sheet element adjacently aligned along the separation line; and heating and/or cooling the glass sheet element to cause expansion and/or contraction so that the portion detaches from the main part along the separation line. The portion and the remaining main part each remain intact as a whole. The step of producing the filamentary damages includes generating a plasma within the volume with laser pulses of an ultrashort pulse laser; and displacing points of incidence of the laser pulses over a surface of the glass sheet element along the separation line.

15 Claims, 6 Drawing Sheets

Related U.S. Application Data continuation of application No. PCT/EP2016/066013, filed on Jul. 6, 2016.

(51) Int. Cl.
*C03B 33/02* (2006.01)
*C03B 33/04* (2006.01)
*B23K 103/00* (2006.01)

(56) References Cited

U.S. PATENT DOCUMENTS

| | | | |
|---|---|---|---|
| 4,467,168 A | 8/1984 | Morgan | |
| 4,526,872 A | 7/1985 | Andrieu | |
| 5,010,041 A | 4/1991 | Koyama | |
| 5,179,045 A | 1/1993 | Aitken | |
| 5,491,115 A | 2/1996 | Pfitzenmaier | |
| 9,815,144 B2 | 11/2017 | Grundmueller | |
| 9,873,628 B1 | 1/2018 | Haloui | |
| 10,597,321 B2 | 3/2020 | Marjanovic | |
| 11,646,201 B1* | 5/2023 | Tassev | H01L 21/02502 |
| | | | 438/479 |
| 2002/0006765 A1* | 1/2002 | Michel | B23K 26/53 |
| | | | 451/28 |
| 2005/0044895 A1* | 3/2005 | Yamate | C03C 23/0025 |
| | | | 250/492.1 |
| 2007/0111481 A1 | 5/2007 | Tamura | |
| 2008/0184740 A1 | 8/2008 | Waldschmidt | |
| 2008/0207424 A1 | 8/2008 | Aitken | |
| 2010/0130341 A1 | 5/2010 | Wondraczek | |
| 2012/0067865 A1 | 3/2012 | Siebers | |
| 2013/0098903 A1* | 4/2013 | Di Giovanni | C03C 10/0027 |
| | | | 219/622 |
| 2013/0112650 A1* | 5/2013 | Karam | B29C 65/7841 |
| | | | 216/13 |
| 2013/0126573 A1* | 5/2013 | Hosseini | B23K 26/0006 |
| | | | 225/2 |
| 2013/0164509 A1 | 6/2013 | Friedrichs | |
| 2013/0206724 A1* | 8/2013 | Nattermann | C03C 23/00 |
| | | | 156/345.51 |
| 2014/0009370 A1 | 1/2014 | Weiss | |
| 2014/0027951 A1* | 1/2014 | Srinivas | B23K 26/009 |
| | | | 264/400 |
| 2014/0194270 A1 | 7/2014 | Shiratori | |
| 2014/0199519 A1 | 7/2014 | Schillinger | |
| 2014/0216108 A1* | 8/2014 | Wiegel | C03B 33/082 |
| | | | 65/56 |
| 2014/0238971 A1 | 8/2014 | Comte | |
| 2015/0034612 A1 | 2/2015 | Hosseini | |
| 2015/0034613 A1 | 2/2015 | Hosseini | |
| 2015/0038313 A1 | 2/2015 | Hosseini | |
| 2015/0118522 A1 | 4/2015 | Hosseini | |
| 2015/0136743 A1* | 5/2015 | Hosseini | C03B 33/091 |
| | | | 219/121.61 |
| 2015/0140241 A1 | 5/2015 | Hosseini | |
| 2015/0140735 A1 | 5/2015 | Hosseini | |
| 2015/0151380 A1 | 6/2015 | Hosseini | |
| 2015/0165548 A1* | 6/2015 | Marjanovic | C03B 33/091 |
| | | | 219/121.73 |
| 2015/0165560 A1 | 6/2015 | Hackert | |
| 2015/0165562 A1 | 6/2015 | Marjanovic | |
| 2015/0165563 A1 | 6/2015 | Manley | |
| 2015/0166391 A1* | 6/2015 | Marjanovic | B23K 26/0624 |
| | | | 428/192 |
| 2015/0166393 A1* | 6/2015 | Marjanovic | B23K 26/0624 |
| | | | 65/61 |
| 2015/0166394 A1 | 6/2015 | Marjanovic | |
| 2015/0166397 A1 | 6/2015 | Marjanovic | |
| 2015/0274579 A1 | 10/2015 | Plevacova | |
| 2015/0299018 A1 | 10/2015 | Bhuyan | |
| 2015/0367442 A1 | 12/2015 | Bovatsek | |
| 2016/0016257 A1 | 1/2016 | Hosseini | |
| 2016/0031745 A1* | 2/2016 | Ortner | B23K 26/53 |
| | | | 65/157 |
| 2016/0031755 A1* | 2/2016 | Hoppe | C03C 23/007 |
| | | | 65/117 |
| 2016/0168018 A1 | 6/2016 | Gabel | |
| 2016/0176752 A1 | 6/2016 | Gabel | |
| 2016/0280580 A1 | 9/2016 | Bohme | |
| 2016/0311717 A1 | 10/2016 | Nieber | |
| 2017/0158551 A1 | 6/2017 | Bookbinder | |
| 2017/0189991 A1 | 7/2017 | Gollier | |
| 2017/0189999 A1 | 7/2017 | Bookbinder | |
| 2017/0197868 A1 | 7/2017 | Gupta | |
| 2018/0029919 A1 | 2/2018 | Schnitzler | |
| 2018/0057390 A1* | 3/2018 | Hackert | C03C 3/093 |
| 2019/0062201 A1 | 2/2019 | Weiss | |
| 2019/0194054 A1 | 6/2019 | Friedrichs | |
| 2019/0194060 A1 | 6/2019 | Weiss | |
| 2019/0194061 A1 | 6/2019 | Weiss | |
| 2019/0322564 A1* | 10/2019 | Wagner | C03B 33/0222 |
| 2020/0039005 A1* | 2/2020 | Thomas | B23K 26/402 |
| 2022/0112123 A1* | 4/2022 | Ortner | C09K 13/02 |

FOREIGN PATENT DOCUMENTS

| | | |
|---|---|---|
| EP | 1074520 | 2/2001 |
| EP | 1742253 | 1/2007 |
| EP | 1811550 | 7/2007 |
| EP | 2754524 | 7/2014 |
| EP | 2781296 | 9/2014 |
| GB | 1562332 | 3/1980 |
| JP | 857209838 | 12/1982 |
| TW | 201417928 | 5/2014 |
| WO | 2012006736 | 1/2012 |
| WO | 2015075059 | 5/2015 |
| WO | 2016010991 | 1/2016 |

* cited by examiner

METHOD AND DEVICE FOR LASER-ASSISTED SEPARATION OF A PORTION FROM A SHEET GLASS ELEMENT

CROSS REFERENCE TO RELATED APPLICATIONS

This application is a continuation of U.S. application Ser. No. 15/871,716 filed Jan. 15, 2018, which is a continuation of International Application PCT/EP2016/066013 filed Jul. 6, 2016, which claims the benefit under 35 USC § 119(a) of German Application 10 2015 111 490.9 filed Jul. 15, 2015, the entire contents of all of which are incorporated herein by reference.

BACKGROUND OF THE INVENTION

1. Field of the Invention

The invention generally relates to laser-assisted separation of a portion from a sheet glass element. More particularly, the invention relates to laser-assisted separation of a portion from the interior of a sheet glass element.

2. Description of Related Art

From WO 2012/006736 A2 it is known that irreversible damages in the form of filaments can be caused in a glass substrate by high-energy laser pulses, and that an aligned series of such damages allows to separate the glass. A filament is produced by an ultrashort laser pulse which causes self-focusing to take place inside the glass due to the Kerr effect until energy density becomes so high at some point that a plasma is ignited. A plasma explosion occurs, during which the glass undergoes irreversible damage around this plasma generation site. From there, further radiation will emanate and will be subject to self-focusing and terminate in another plasma explosion. This effect is repeated several times, depending on intensity. The energy decreases across the entire glass thickness, so the first plasma spots will have the greatest energy and also produce the greatest damage.

Document US 2014/027951 A1 relates to a method for separating brittle material such as glass, ceramics, or sapphire by means of laser radiation. The method can be used to separate thin substrates with a thickness of less than 500 μm.

Document US 2015/165560 A1 relates to a laser method which makes it possible to separate an inner portion from a glass substrate. The method is used to produce holes in a thin glass substrate having a thickness of 0.7 mm.

In order to remove an inner contour, it is proposed to produce additional severing lines and to break off individual pieces. An alternative embodiment suggests to melt an inner contour by heating and to remove it in this way.

Document US 2015/166393 A1 also relates to a laser-assisted method which is intended to help in severing a portion from a glass element. The glass element has a thickness of 0.4 or 0.7 mm in this case. The separation can be accomplished by applying a bending force. In a further embodiment, an additional $CO_2$ laser is provided which moves along the separation line to locally generate thermal stresses which are intended to gradually cause separation.

Finally, document EP 2 754 524 A1 relates to a method for laser-based processing of sheet-like glass substrates or semiconductor wafers using a laser source. Separation of the material along the separation line is accomplished either by internal stress of the material or by introduced forces.

DE 10 2012 110 971 A1 describes a method for preparing separation of transparent workpieces, in which filamentary structures are produced by ultrashort laser pulses along a separation line, which filamentary structures extend across the workpiece and are aligned next to each other. The material is thereby perforated along this separation line and thus pre-damaged. In a subsequent step, separation of the workpiece is accomplished.

If it is desired to completely separate certain portions from a workpiece, the material will usually be divided into two completely separated regions by the separation line. If now, once filaments have been produced in the material along such a separation line, a suitable tension is applied to the material in a further step, the material can be separated along the generated predefined breaking line, that is to say along the separation line, so as to obtain the separated portion on the one hand, and on the other a remaining main part. The separated portion may typically also be referred to as an inner portion, and the remaining main part as an outer portion.

If the separation line is rectilinear, then the separation following the laser processing will be simple. However, separation will be more difficult if the separation line is curved, has several sections at an angle to one another, or even forms a closed line. The latter case is given, inter alia, when an inner contour or a hole is to be made. For example, this is the case when a window is to be cut into a glass plate. This is also the case when a glass part is to be produced which has an outer contour that is completely defined by the separation line.

The separation of glass along separation lines that have a generally curved shape, angled sections, or which even define a closed loop is difficult because it is not readily feasible to exert a sufficient bending moment onto the glass along the separation line.

One possibility of how to nevertheless cut inner contours out of sheet-like substrates can be found in EP 2 781 296 A1. In the method described therein, after introducing crack lines along a contour line (contour defining step), the portion to be separated from the substrate is thermally deformed or melted by high laser power (material deforming or removing step), so that this portion can be separated from the substrate more easily. To promote separation, further crack lines may be introduced into the portion to be separated, for example spiral or V-shaped crack lines, in order to remove the latter in smaller pieces. A disadvantage of this method, on the one hand, is its high complexity which reduces economic benefits, and on the other the deterioration of the portion to be separated, which otherwise might be of interest due to its exact fit to the remaining main part of the substrate. Another disadvantage of the deterioration of the portion are the particles and splinters that are resulting, and therefore elevated cleaning costs.

SUMMARY

The present invention is therefore based on the object to allow an efficient and clean, especially splinter-free separation of a portion from a sheet glass element along non-rectilinear separation lines in such a manner that both the separated portion and the remaining main part of the glass element are not further damaged.

One aspect of the object includes to enable such a separation of inner portions along separation lines in the form of closed loops.

Another aspect of the object includes to enable such a separation while minimizing the risk of detrimental cracking in both the separated portion and the remaining main part of the glass.

The inventive method for separating a portion from a sheet glass element along an intended separation line which divides the glass element into a portion to be separated and a remaining main part is based on the fact that filamentary damages are produced in the volume of the glass element adjacently aligned along the separation line, and that the damages are produced by laser pulses of an ultrashort pulse laser, wherein the material of the glass element is transparent for the laser pulses, and the laser pulses generate a plasma within the volume of the glass element, which causes the filamentary damages, and the incidence points of the laser pulses on the glass element are displaced over the surface thereof along the separation line, and once the filamentary damages adjacently aligned along the separation line have been introduced, the glass element is heated in the region of the main part so as to cause expansion thereof and/or is cooled in the region of the portion so as to cause contraction thereof, so that the portion detaches from the main part at the adjacently aligned filamentary damages along the separation line, wherein the portion and the main part each remain intact as a whole.

By the expansion of the main part and/or the contraction of the portion, these parts change their size differently from each other. In case the portion is cooled, for example, "shrinking" of the portion relative to the main part will be caused. Due to the relative change in size, the portion will detach from the main part.

Preferably it is contemplated that once the filamentary damages adjacently aligned along the separation line have been introduced, a point of incidence of laser radiation, preferably of a carbon dioxide laser, is displaced over the surface of the glass element along the separation line so that local tensile stresses are caused in the glass along the separation line in order to cause crack formation between adjacent filamentary damages. Such a method step is also referred to as a cleaving step. This cleaving method step may also be promoted by local cooling following the heating in order to increase the tensile stresses generated in the material.

A cleaving step is used for preliminary separation. In this case, the glass element is preferably irradiated by a $CO_2$ laser along the separation line in order to generate thermo-mechanical stresses in the glass element at the separation line. This makes it possible to initiate formation of cracks connecting the filamentary damages along the separation line so as to cause severing along the separation line at least in sections thereof, but usually without the portion detaching from the main part. Therefore, the cleaving step is preferably performed prior to the method step of heating in the region of the main part and/or of cooling in the region of the portion.

Both the filament structures per se and additional cracks in the material as caused by a cleaving step are preliminary damages in the material that extends along the separation line.

According to the invention it is contemplated that both the main part and the portion remain intact as a whole. An advantage of preserving both the main part and the portion as a whole is that both pieces can be reused. Depending on the purpose for which the separation process is applied, either the main part or the portion or both pieces may be in the focus of interest. If mainly the main part is of interest, the preservation of the portion is advantageous because fewer residues and splinters will result and the portion can in turn be used as a starting material without need to be melted down. If both pieces are of interest, the precise complementary shape of the two pieces may be of advantage. In addition, compared to a method in which a portion to be separated is divided into several smaller pieces, processing complexity is significantly reduced.

The precision separation method employed for the invention in which defined damages are generated in a material within a very small space using laser pulses of an ultrashort pulse laser is based on local destruction of the material in the interaction zone with the laser light, whereby closely spaced sub-micrometer hollow channels are produced, that is to say hollow channels with diameters of less than 1 micrometer.

The filamentary damages produced by the laser pulses preferably have a length of at least 200 micrometers, more preferably at least 500 micrometers. For this purpose, suitable pulse energies and pulse durations are selected. The minimum lengths of filamentary damages as specified are advantageous because they promote the separation of the portion.

Particularly advantageous for the generation of long filamentary damages is an operation of the ultrashort pulse laser in the so-called burst mode. In this operation mode, the laser pulse is not emitted as a single pulse, but as a sequence of pulses emitted in quick succession, which together form a pulse packet, a so-called burst. Accordingly, one embodiment of the invention contemplates an operation of the ultrashort pulse laser in the form of an emission of laser pulses in time succession, in the form of bursts or pulse packets, wherein each of such bursts preferably generates a respective one of the filamentary damages.

Such a pulse packet generally has a slightly higher energy than a single pulse in the conventional single-shot operation. However, the pulses of a burst contain significantly less energy than a single pulse. Furthermore, the pulse energies of the pulses typically decrease within a burst.

A suitable laser source according to the present invention is a neodymium-doped yttrium-aluminum-garnet laser having a wavelength of 1064 nanometers. The laser source in particular operates at a repetition rate between 10 kHz and 120 kHz, preferably between 30 kHz and 110 kHz, and most preferably between 35 kHz and 105 kHz. The scan rate can preferably be chosen such that, depending on the repetition rate, the spacing between adjacent filamentary damages will be in a range from 4 micrometers to 10 micrometers.

In this case, the suitable pulse duration of a laser pulse is in a range of less than 100 picoseconds, preferably less than 10 picoseconds. The pulse duration may even be less than 1 picosecond. Most favorably, the laser source is operated at a typical power in a range from 40 to 100 watts. According to one advantageous embodiment of the invention, a pulse energy of more than 200 microjoules is applied in the burst, and furthermore advantageously a total burst energy of more than 500 microjoules, in order to achieve the filamentary damages.

In case the ultrashort pulse laser is operated in the burst mode, the repetition rate is the rate of repeated burst emission. The pulse duration is essentially independent of whether a laser is operated in the single-pulse mode or in the burst mode. The pulses within a burst typically have a similar pulse length as a pulse in the single-pulse mode.

Apart from tiny amounts, no material is removed from the separation seam during the microperforation employed for the invention. When the filamentary damages have been introduced, both parts to be separated will still be substantially connected to each other.

Once the microperforation according to the invention has been accomplished, a predetermined breaking line is existing in the material along the separation line, along which the material is not yet separated, but can be easily separated if a suitable stress is induced in the material. In particular a cleaving step is suitable for this purpose.

In principle it would be possible to simply generate stresses in a sheet glass substrate by bending the substrate, for example. In case of bending, the material is stretched in one half of its volume thereby creating a tensile stress in that half, while simultaneously being compressed in the other half of the volume thereby creating a compressive stress there. In this case, the two aforementioned volume halves are delimited from each other by a plane which is located centrally between the two surfaces of the substrate and is also referred to as a neutral zone, since it is neither subjected to a tensile nor to a compressive stress. However, the bending of a glass substrate is mainly suitable for the separation along a predetermined breaking line, if the predetermined breaking line is as straight as possible.

By contrast, the heating of the glass element according to the invention in the region of the main part and/or the cooling thereof in the region of the portion allows to generate tensile stresses in the element that are essentially effective across the entire thickness of the element. This means that tensile stresses can be generated without simultaneously generating compressive stresses.

A first option according to the invention is to cause expansion of the main part by heating the element exclusively in the region of the main part, while the element is not heated in the region of the portion. As a result, the element will expand stronger in the region of the main part than in the region of the portion. Thereby, a tensile stress can be produced in the glass element, due to which the portion will separate from the main part along the separation line. Furthermore, the portion will detach from the main part. Thus, if it is desired to separate inner portions from the element, the substrate can be heated except for the inner geometries. When a certain temperature is reached, it will then be possible to remove the inner geometries.

One example for how to effect the heating of the glass element except for the inner geometries is heating using a heating plate which has a recess corresponding to the inner geometries. However, there are also many other possibilities conceivable for heating the glass element exclusively in the region of the main part. For example, it can be heated by exposure to light, while the portion is covered. Also, the main part can be subjected to a flow or jet of a warm fluid, or it can be heated using a $CO_2$ laser which is passed over the main part.

A second option according to the invention is to cause expansion of the main part by heating the element in the region of the main part, and to cause contraction of the element in the region of the portion by cooling it. In this way it is possible to further increase the tensile stress in the material.

One example for the case of inner portions is to effect the heating of the glass element using a heating plate in which the inner geometries are recessed and to subject the element to an air flow through the recesses, so that it is additionally cooled in the region of the inner geometry. It is also possible to cool the element in the region of the inner geometry using other fluids than air, or to use a cooling plate.

The heating of the element in the region of the main part and the cooling in the region of the portion may but need not be performed simultaneously. For example, it is also possible to heat the glass element in its entirety (thereby consequently also heating it in the region of the main part) and then to cool it in the region of the portion. The reverse procedure is also conceivable, that is to completely cool the element and then to heat it up in the region of the main part.

A third option according to the invention is to cause contraction of the portion by cooling the element exclusively in the region of the portion, while the element is not cooled in the region of the main portion.

In any case, according to the invention the portion is separated from the main part without additional auxiliary cuts in the region of the portion. An advantage of avoiding additional auxiliary cuts is that tensile stresses in the glass element which may arise as a result of heating up and/or cooling down will not split up to such additional auxiliary cuts but will unfold their full effect at the desired separation line. Thus, according to the invention neither the portion nor the main part is damaged in addition to the damage caused by introducing the filaments along the separation line. After detachment, the main part and the portion will only exhibit the damages introduced at their cut edges.

Due to the precision separation process by microperforation that is employed, a very high edge quality is achieved at the cut edges. Since the quality of the glass edge is of great importance for the flexural strength of a glass element, high edge quality also leads to increased flexural strength of the main part and the portion. In other words, a neatest possible glass edge with the fewest and smallest possible and preferably no chipping, notches, and other unevenness contributes to a reduction of the risk of glass breakage.

If the glass element is heated in the region of the main part, this step can be integrated into an optional subsequent toughening process or ceramization process of the main part.

According to one embodiment of the invention, the glass element is heated in the region of the main part and caused to expand, and/or is cooled in the region of the portion and caused to contract, thereby producing a temperature difference between the average temperature of the main part and the average temperature of the portion, which is at least 150 degrees Celsius, preferably at least 200 degrees Celsius, more preferably at least 300 degrees Celsius.

According to one embodiment of the invention, the glass element is heated in the region of the main part and caused to expand, and once the portion has detached from the main part at the adjacent filamentary damages along the separation line, the main part is thermally toughened by exploiting the heating that has been caused.

According to this embodiment of the invention, the portions of the glass element that have already been heated are directly toughened, thereby avoiding further high energy costs. That means, the main part is thermally toughened in an energy-efficient manner. The toughening of the heated parts immediately following the separation is in particular made possible due to the employed precision separation method using filamentation, which produces a high edge quality, so that it is in particular not necessary to grind or otherwise process the edge produced by the separation of the portion from the main part.

Furthermore, it is also possible to ceramize the main part by utilizing the heating that has been produced. In this way, the main part can be ceramized in an energy-efficient manner, that is, converted into a glass-crystal mixed body. Thus, for energy saving reasons it is advantageous to perform the ceramizing following the separation process.

Accordingly, a processing chain can for instance be realized as follows: First, the glass element is filamented by laser pulses, that is microperforated along at least one defined separation line. At least one of these separation lines describes a non-rectilinear separation line in the sense of the present invention. In the present example an inner contour will be assumed representing the portion. Further separation lines may also be given, for example outer contours along which the glass element is initially separated in a different way than according to the inventive method, for example by applying stresses in the glass element by bending or by irradiation with a $CO_2$ laser. The edges created by the separation along these further separation lines may be ground after separation, for example a so-called C-cut can be done. Other optional steps may include cleaning and printing the glass element. Subsequently, a cleaving step is preferably performed along the separation line of the inner contour, by which the filaments are interconnected so that the inner contour separates from the main part, but without detaching from the main part. Then, the portion is detached from the main part using the method according to the invention, by heating the main part and causing it to expand, whereby the inner contour is released, and both cut edges, the one produced on the portion and the one on the main part have very high edge qualities, in particular distinguished by chipping of less than 10 micrometers, more preferably less than 5 micrometers, and by a roughness with an Rz value of less than 30 micrometers, preferably 20 micrometers, more preferably 10 micrometers. Finally, the main part is thermally toughened taking advantage of the heating already effected for the separation. The main part may as well be ceramized by taking advantage of the resulting heating. Subsequently, the main parts and/or portions of the glass element can be packed.

The thermal tempering or thermal toughening is based on quenching of the glass element to be toughened. In this process, first the surface of the element cools down, while there is still a warmer or softer phase in the interior. The temperature difference to the environment will then be greater inside than outside. The interior of the glass element would then contract more, but this is prevented by the already solid surface. As a result, a tensile stress arises in the interior, while a compressive stress is produced at the surface.

An advantage of thermal toughening is that this is a rather inexpensive method of increasing strength. In this way, this embodiment of the invention thus provides an efficient method for separating and subsequent toughening. Thus, the economic benefit of this embodiment of the invention is increased. On the other hand, thermally toughened glass elements are usually not well suited for being cut and severed. However, according to the present embodiment of the invention, the microperforating, cutting, and separating is not necessary after the toughening, because all necessary separation steps can be performed previously on the not yet toughened glass element. According to the exemplary processing chain described above, this applies both to separations along non-rectilinear separation lines in the sense of the present invention, and optionally also to further separation lines along which the separation can as well be effected using conventional methods.

The method described in EP 2 781 296 A1 may also be used for glasses with tempered or toughened surfaces. A disadvantage hereof, as mentioned above, is that such glasses cannot be cut very well anymore and will crack more readily than non-toughened or non-tempered glasses, so that the risk of detrimental crack formation will be increased during the contour definition step in this case. In addition, it is necessary to quite accurately control the laser parameters such as laser power and cutting speed. These disadvantages are avoided by the embodiment of the present invention described above.

According to one refinement of the invention, the material of the glass element has a thermal expansion coefficient of greater than $3\times10^{-6}\,K^{-1}$, preferably greater than $4\times10^{-6}\,K^{-1}$, more preferably greater than $7\times10^{-6}\,K^{-1}$.

The thermal expansion coefficient of a glass is a parameter that indicates how the dimensions of a corresponding glass element will change by expansion or contraction as a result of a change in temperature. Thermal expansion coefficient refers to the coefficient of linear thermal expansion $\alpha=(1/L)(\Delta L/\Delta T)$, wherein $\Delta T$ denotes the temperature difference and $\Delta L$ the change along a linear dimension relative to the original length L.

According to one embodiment of the invention, the glass element has a thickness of at least 2 millimeters, preferably at least 3 millimeters, more preferably at least 4 millimeters, most preferably at least 5 millimeters. The inventive method for laser-assisted separation of a portion from a sheet glass element is particularly suitable for sheet-like elements having the aforementioned thicknesses. By contrast, with conventional separation methods such as the application of a bending moment, the separation of glass along predetermined breaking lines that have a generally curved shape, angled sections, or even define a closed loop becomes increasingly difficult with increasing thickness of the glass. This is due to the fact that in the case of conventional separation processes, the risk of jamming between the parts that are still in contact is getting greater and greater with increasing substrate thickness. Therefore, reliable separation in conventional manner may become difficult or even impossible in case of rather thick glass elements.

The method described in EP 2 781 296 A1 proposes to cause a gravitation-related teardrop-shaped bulge of the contour to be separated in the irradiated area, due to thermally induced yielding of the substrate material, so as to thereby form a gap to the remaining substrate material. However, a disadvantage of this method is that it is only suited for limited glass thicknesses. Namely, if the glass is too thick, the effect of gap formation due to the yielding of the material is getting weaker relative to an expansion caused by the heating of the contour to be separated in the plane of the substrate. The present method for laser-assisted separation of a portion from a sheet glass element according to the invention, by contrast, is particularly suitable to thicker glass elements. It is even possible to process glasses having a thickness of more than 5 millimeters; in particular thicknesses of more than 8 millimeters can also be processed successfully.

Furthermore, the glass element preferably has a thickness of at most 20 millimeters, more preferably of at most 15 millimeters, and most preferably at most 10 millimeters. Glasses of such maximum thicknesses in the aforementioned ranges are still well suitable for severing and reliably separating the portions using the method according to the invention.

In case of thicker glass elements it is often no longer possible or at least inappropriate to perform the microperforation across the entire thickness in one processing step or by passing the point of incidence of the laser beam along the separation line in a single pass. Rather, for enabling a simple and reliable separation of the portion, it is favorable to perform two or more passes with different focal depths.

According to one embodiment of the invention it is contemplated to produce filamentary damages in the volume of the glass element adjacently aligned along an offset line which is spaced from the separation line by at least 5 and at most 50 micrometers, preferably at most 40, more preferably at most 30 micrometers at any point of the separation line, wherein a projection of these filamentary damages onto the longitudinal extension of the filamentary damages produced along the separation line exhibits an overlap of less than 200 micrometers, preferably less than 100 micrometers, more preferably less than 50 micrometers with the filamentary damages produced along the separation line.

Furthermore, in similar manner, filamentary damages can be generated in the volume of the glass element along a second offset line that is spaced from the first offset line.

According to a further embodiment of the invention, the portion has a minimum extension of at least 5 millimeters, preferably at least 10 millimeters, more preferably at least 20 millimeters along a first lateral dimension, and has a minimum extension of at least 5 millimeters, preferably at least 10 millimeters, more preferably at least 20 millimeters along a second lateral dimension that is orthogonal to the first lateral dimension.

It will be advantageous if the portion to be separated has a certain minimum extension along each of the two lateral dimensions, that is, along the two dimensions extending in parallel to the sheet glass element, i.e. in the plane of the element. This is based on the fact that the relative expansion of the main part relative to the portion (or else the contraction of the portion relative to the main part) as caused according to the present method results in a tensile stress that will be the greater the larger the portion to be separated is. In case a cleaving step is additionally performed, a certain minimum extension will be advantageous as well, in particular in the case of inner portions (inner contours) as will be explained below by way of an example.

This can be illustrated, for example, by assuming that the portion has already been completely separated from the main part along the separation line by a cleaving step, i.e. it is not just microperforated. Now, if the portion is a square of 10×10 millimeters inside the main part, for example, an expansion of the main part or contraction of the portion by 10 percent will result in a total gap width of one millimeter in each lateral dimension, that is 0.5 millimeters all around the square portion. On the other hand, if it is assumed that the portion only has dimensions of 1×1 millimeter, a gap width of 0.05 millimeters would only be resulting.

The tensile stress generated due to the temperature difference between the main part and the portion (in the case without a cleaving step) or the width of the created gap (in the case of a cleaving step) will be the greater the larger the surface area of the portion. It has proven to be advantageous for the portion to have a minimum extension along each of its two lateral dimensions of at least 5 millimeters, preferably at least 10 millimeters, more preferably at least 20 millimeters. In the case of such dimensions, detachment can be achieved with many glass materials by heating the material in the region of the main part to a temperature below the glass transition temperature, while maintaining it at room temperature in the region of the portion and optionally additionally cooling it there by exposing it to an air flow.

However, although advantageous, it is not absolutely necessary for the portion to exceed the aforementioned dimensions. For example, it is also possible for the portion to be cooled down much stronger using special cooling fluids such as, e.g., nitrogen, or by using cooling plates, etc., so that even in case of smaller portions a tensile stress will arise that is sufficient for separation. Depending on the glass, the glass transition temperature might be so high that stronger heating of the main part is possible without permanent deformation, so that smaller portions can be separated as well.

Furthermore, it is also possible to heat the glass element unevenly in the region of the main part, and/or to cool it unevenly in the region of the portion. For example, extensions or tongues of the portion may be cooled more strongly.

The desired detachment of the portion from the main part in the context of the inventive method depends on various parameters. One important parameter is the minimum extension L of the portion along the first or along the second lateral dimension. Another important parameter is the temperature difference $\Delta T$ in Kelvin between the average temperature of the main part and the average temperature of the portion that is caused according to the method of the invention. Another important parameter is the coefficient of (linear) thermal expansion $\alpha=(1/L)(\Delta L/\Delta T)$ of the employed glass. With these three parameters it is now possible to estimate, in the most simplest way, the minimal gap width S arising between the main part and the portion as a result of the heating and/or cooling in the sense of the inventive method: $S=\Delta L/2=L\cdot\Delta T\cdot\alpha/2$. Advantageously, the parameters L, $\Delta T$, and a are adjusted in coordinated manner such that the minimal gap width S is greater than the mean roughness R of the edge surface of the portion at which the portion is detached from the main part. In accordance with a common definition, the average roughness R herein indicates the average distance of a point on the edge surface to an averaged surface, wherein the averaged surface corresponds to the ideal edge surface, or—mathematically speaking— intersects the actual profile of the edge surface such that the sum of the deviations of the actual profile with respect to the averaged surface becomes minimal.

In one embodiment of the method according to the invention it is accordingly contemplated that the minimum extension L of the portion in the plane of the sheet glass element, the temperature difference $\Delta T$ in Kelvin which is caused between the average temperature of the main part and the average temperature of the portion, the coefficient of thermal expansion $\alpha$ of the material of the glass element, and the average roughness R of the edge surface of the portion along which the portion separates from the main part, satisfy the inequation $L\cdot\Delta T\cdot\alpha>R$.

In one embodiment of the invention, the glass element is divided by the separation line in such a manner that the main part assumes a two-dimensional shape which is not star-shaped in a sense of mathematical topology in the plane of the sheet glass element.

The separation of glass along predetermined breaking lines that have a generally curved shape or angled sections using conventional separation methods becomes more and more difficult the more curves or angles the separation line has. Apart from an inner portion with a closed-loop separation line, the separation of a portion is already particularly difficult if the portion is a partially inner or almost inner portion, so that the separation line is not yet completely closed. A criterion for such a situation is that the two-dimensional area which corresponds to the main part of the glass element is not a star-shaped area in a mathematical sense. This means that within this two-dimensional area there is no point from which any other point of the area can be reached via a straight link that lies entirely in the area.

While some conventional separation methods run into particular difficulties when the main part of the glass element is not star-shaped in a mathematical-topological sense, the present invention is particularly suitable for such situations.

While the main part can readily assume a shape that is not star-shaped, it is advantageous for the neatest possible separation—albeit not absolutely necessary—if the portion assumes a shape that is star-shaped. This is due to the fact that in this case the two-dimensional area corresponding to the portion will have at least one point from which any other point of the area can be reached via a straight link that lies entirely in the area. Therefore, the region can be contracted with respect to such a star point without entangling with the region corresponding to the main part during the contraction. The described contraction of the region can be understood as a correspondence to a cooling of the portion.

Some exemplary two-dimensional shapes that are star-shaped in a mathematical sense and which the portion may assume in the plane of the glass element include those of a regular polygon, a regular polygon with rounded corners, an oval, or a circle.

In one embodiment of the invention, the glass element is divided by the separation line in such a manner that the main part completely encloses the portion in the plane of the sheet glass element.

The separation of glass along closed-loop separation lines, that means the separation of an inner portion located within the two-dimensional surface, or in other words the creation of holes or cut-outs in a sheet glass element is difficult for conventional separation methods. One reason for this, among others, is the aforementioned problem of applying a bending moment, but also that sometimes only few or no material is removed by the laser pulses during the microperforation. By contrast, the present invention is particularly suitable for such situations.

The present method can be applied to almost any shape of an inner portion, or, in other words, of the inner contour or the closed-loop separation line. As explained above, it is advantageous for a neatest possible separation, albeit not absolutely necessary, that the portion has a star-shaped two-dimensional shape in the plane of the sheet glass element. For example it is possible to remove round or simple angled portions or even portions of more complex shapes from the glass element.

According to a further embodiment of the invention, the laser pulses are directed obliquely onto the surface of the glass element, so that the direction of light propagation of the laser pulses and thus also the longitudinal extension of the filamentary damages extend obliquely relative to the surface, and furthermore so that the separation line extends obliquely, preferably perpendicular, to the light incidence plane. The light incidence plane is spanned by the propagation direction of the laser beam and the surface normal.

In other words, the damage channels are introduced in such a manner that the direction of their longitudinal extension is different from the direction of the surface normal of the glass element. The result thereof is in an inclined cut or separation surface between the parts to be separated.

The creation of inclined filamentary damages, or in other words the introducing of the perforation into the material at an angle can facilitate the separation of a portion, because instead of a fit a certain opening angle is provided which further reduces the risk of jamming.

If thicker glasses are processed with multiple passes by a laser processing device, different focal depths will typically be used. That means, if the length of the formed filaments is insufficient to traverse the glass in its entire thickness, several passes are performed with the laser along the separation line to produce filaments at different depths. At greater focal depths, that is the more the damage channels are spaced from the entrance side into the glass, it may happen that the lengths of the filamentary damages become shorter. The reason for this is that fractions of the laser radiation are reflected on the substrate surface when an inclination angle is used. Inclination angle means a non-zero angle between the surface normal of the glass element and the direction of incidence of the laser pulses. Therefore, in the case of thicker glasses it is often advantageous to keep the inclination angle small. With the method of the invention, detachment without any risk of jamming will usually already be possible even in case of small inclination angles.

One of many application examples of detaching inner geometries is the manufacturing of glass hob tops, for example of soda-lime glass. In this case, the soda-lime glass will additionally be toughened as described above.

The method according to the invention permits to produce an inventive product in the form of a set of two planar, i.e. plate-shaped or sheet-like glass elements.

The set of two sheet glass elements according to the invention is distinguished by the fact that the two-dimensional shape one of the sheet glass elements has in its plane is complementary to the two-dimensional shape the other one of the sheet glass elements has in its plane, and that two edges of the one sheet glass element, which define the transition between the faces and an edge surface connecting the faces each have a respective similar shape as two edges of the other sheet glass element, which define the transition between the faces and an edge surface connecting the faces, and wherein these edge surfaces of the two sheet glass elements each have adjacently aligned filamentary damages forming indentations in these edge surfaces, wherein each of the filamentary damages has a longitudinal extension in the direction from one edge to the other edge.

Theoretically, therefore, one sheet glass element could be precisely fitted to the other sheet glass element, apart from friction and jamming problems.

In one embodiment of the invention, the two-dimensional shape the one of the sheet glass elements has in its plane, encloses the two-dimensional shape the other one of the sheet glass elements has in its plane.

In one embodiment of the invention, the one of the sheet glass elements is thermally toughened. According to this embodiment of the invention it may be contemplated that the toughened sheet glass element remains in a state of slightly increased extension due to the thermal toughening. Accordingly, it may be possible not only theoretically but also practically, according to this embodiment of the invention, to accurately fit the one sheet glass element to the other sheet glass element, since friction and jamming problems are avoided by the slight expansion of the one sheet glass element as caused by the toughening. Such a set of two sheet glass elements, which can be fitted together accurately, may fit so precisely that it is liquid-tight. This can be exploited, for example, for producing liquid-tight closures made of glass.

It may also be contemplated that one or both of the sheet glass elements is ground on the edge surface that exhibits filamentary damages. Thereby, fitting together may be made possible as well in practice.

Furthermore, one of the sheet glass elements of the set of two sheet glass elements according to the invention may be in a ceramized state.

The embodiment of the method according to the invention in which a plurality of laser processing steps are employed in different focal depths, permits to produce a product according to the invention in the form of a sheet glass element, i.e. plate-shaped or sheet-like glass element.

A sheet glass element of the invention is distinguished by an edge surface that includes adjacently aligned filamentary damages which form indentations in the edge surface, wherein the filamentary damages have a longitudinal extension in the direction from one edge to the other edge which define the transition between the edge surface and the faces of the sheet glass element, and wherein the edge surface has at least one offset extending along the entire edge surface and extending substantially perpendicular to the longitudinal extension of the filamentary damages, and wherein the offset is in the form of a step of at least 2 micrometers and at most 30 micrometers.

According to yet another embodiment of the invention, an inventive method for removing a portion from a sheet glass element is based on defining a separation line which divides the glass element into the portion to be removed and a remaining main part, and producing filamentary damages in the volume of the glass element adjacently aligned along the separation line, and producing the damages by laser pulses of an ultrashort pulse laser, wherein the material of the glass element is transparent for the laser pulses, and the laser pulses generate a plasma within the volume of the glass element which causes the filamentary damages, and the incidence points of the laser pulses on the glass element are displaced over the surface thereof along the separation line, and, once the filamentary damages adjacently aligned along the separation line have been introduced, the glass element is toughened, and once the glass element has been toughened, cracking is caused in the region of the portion and propagation of the cracking is delimited by the filamentary damages adjacently aligned along the separation line, so that the portion can be removed from the main part along the filamentary damages adjacently aligned along the separation line and the main part remains intact as a whole.

In the method for removing a portion from a sheet glass element, the entire substrate, that means the entire glass element, is toughened. The toughening may be accomplished in different ways, for example thermally or chemically. After the toughening, self-fracturing is initiated within the portion, while the filamentation is effective as a propagation boundary for the resulting cracks. As a result, only the portions will break up into small pieces of glass, as it is known from thermally toughened single-pane safety glass, for example. Preferably, the portion has a shape that is simply contiguous in the plane of the sheet glass element. It is not necessary, but may be advantageous, that the two-dimensional shape is star-shaped or even convex.

BRIEF DESCRIPTION OF THE DRAWINGS

The invention will now be explained in more detail with reference to the accompanying figures, wherein the same reference numerals designate the same or equivalent elements, and wherein.

DETAILED DESCRIPTION

FIGS. 1a through 1d schematically shows a laser processing device 1, which can be used for microperforating a glass element 2 by introducing filamentary damages 20 along a defined separation line 21 and thus preparing it for subsequent separation.

Laser processing device 1 comprises an ultrashort pulse laser 10 for directing laser pulses 12 onto the glass element 2. For this purpose, the laser pulses 12 are focused onto the glass element 2 using focusing means 11. The wavelength of the ultrashort pulse laser 10 is selected so that the laser pulses 12 can penetrate into the glass element 2.

The laser pulses 12 generate a plasma in the volume of the glass element 2 causing the filamentary damages 20. The incidence points 13 of the laser pulses 12 on the glass element 2 are successively displaced over the surface 22 along the defined separation line 21. Separation line 21 is defined so that it completely divides the glass element 2 into a portion 4 to be separated and a remaining main part 3.

Figure 1A:
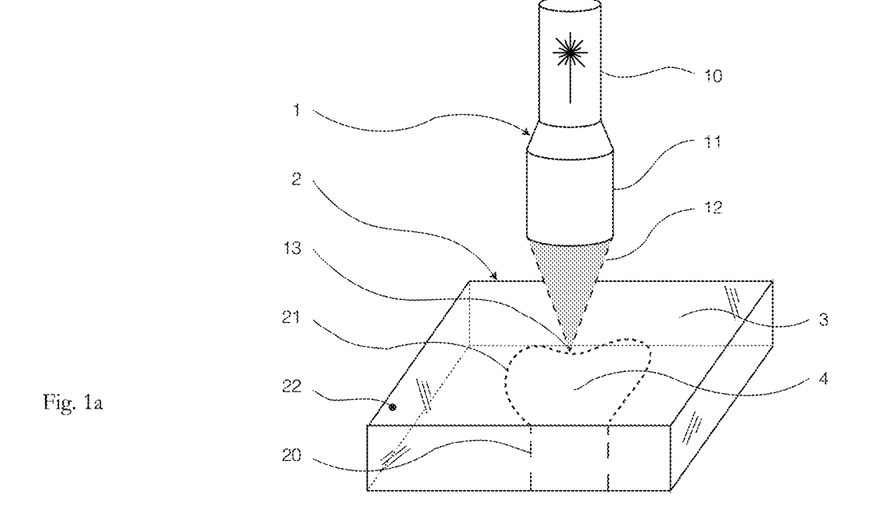
FIGS. 1a through 1d are schematic perspective views of a laser processing device for producing filamentary damages in the volume of a glass element along different separation lines.
Figure 1B:
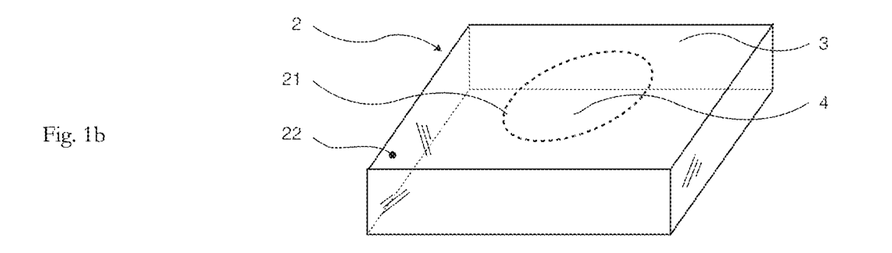
Figure 1C:
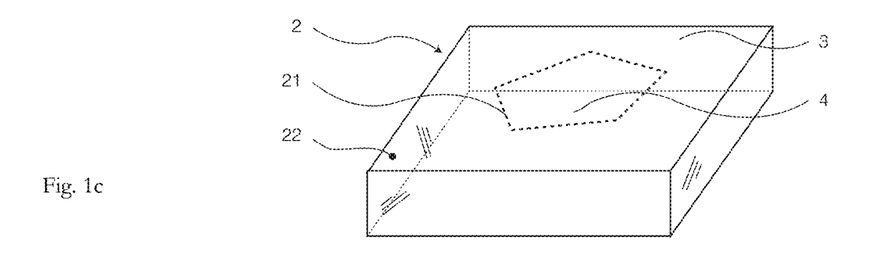
Figure 1D:
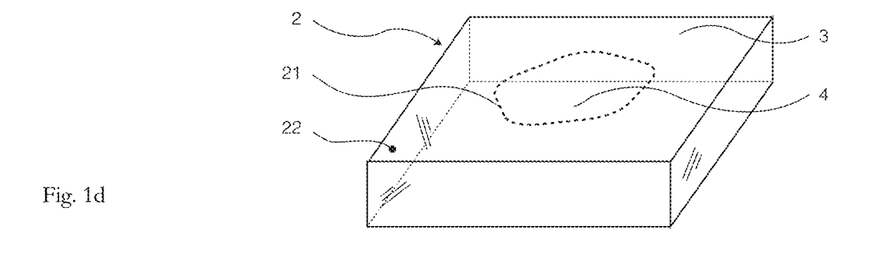

FIGS. 1a through 1d illustrate different exemplary separation lines 21. FIG. 1a shows a curved non-rectilinear separation line which does not form a closed loop. FIGS. 1B-d show closed-loop separation lines 21 of different shapes. FIG. 1B shows an oval separation line 21, FIG. 1c shows a separation line 21 in the form of a regular pentagon, and FIG. 1d shows a separation line 21 in the form of a regular pentagon with rounded corners.

Figure 2:
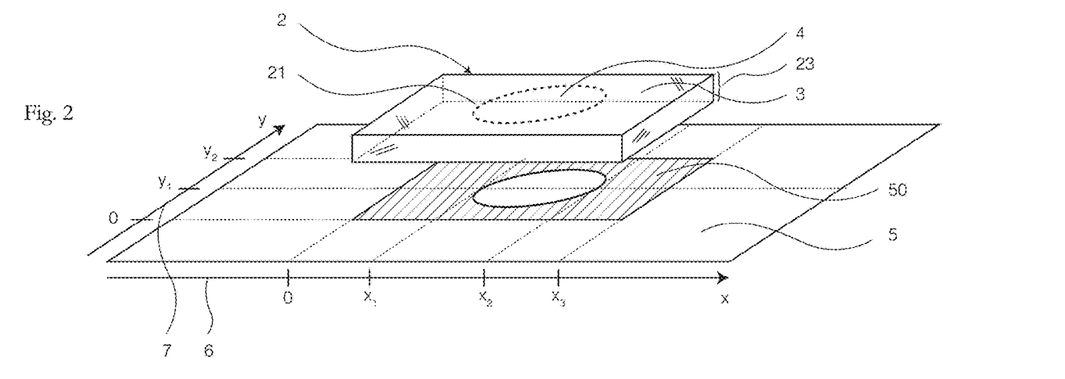
FIG. 2 is a schematic perspective view of a heating device for heating the glass element in the region of the main part.

FIG. 2 schematically illustrates an exemplary heating device 5 for heating the glass element 2 in the region of main part 3. For the sake of better illustration, glass element 2 is considerably spaced from heating device 5 in FIG. 2. In reality, by contrast, the glass element 2 may contact the heating device 5. Accordingly, the lower surface of sheet glass element 2 may rest on heating device 5.

In FIG. 2, sheet glass element 2 has its longest extensions along the x and y dimensions shown. The two dimensions extending along the longest extensions of glass element 2 will also be referred to as first lateral dimension 6 and second lateral dimension 7. Along the dimension which is orthogonal to lateral dimensions 6 and 7, the glass has a thickness 23.

The heating device 5 which is shown in FIG. 2 by way of example has a planar design and may accordingly also be referred to as a heating plate. Here, the surface of this heating plate is in parallel to the two lateral dimensions 6 and 7 of glass element 2, i.e. to the x and y dimensions shown in FIG. 2.

The heating plate heats the glass element 2 in the region of main part 3. More generally, without being limited to the exemplary heating device, the heating plate may have a heating zone 50 that is adapted to the shape of the main part 3. In the case shown, the heating zone extends along the first lateral dimension 6 from value x=0 to value x=$x_3$ and along the second lateral dimension 7 from value y=0 to value y=$y_2$, and has a central recess matching portion 4, extending from x=$x_1$ to x=$x_2$ for the value y=$y_1$, for example. Accordingly, glass element 2 will be subjected to different temperatures on a surface extending in the plane of the two lateral dimensions (x and y dimensions), as a function of the location on this surface (x and y values).

Figure 3:
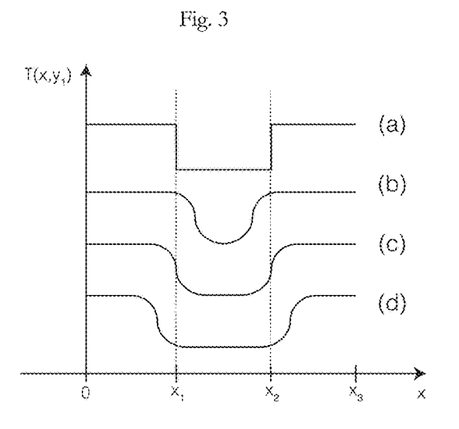
FIG. 3 is a schematic diagram of graphs of temperature as a function of the location with respect to the lateral dimensions of a sheet glass element.

FIG. 3 shows different schematic temperature profiles in glass element 2, which are suitable for the separation of portion 4 from main part 3 according to the invention. The temperature profiles are shown as functions of the location x of a first lateral dimension 6 at a predefined value y=$y_1$ of the second lateral dimension 7. Predefined value y=$y_1$ of the second lateral dimension is chosen so that the profile of value x along the first lateral dimension includes locations in the region of main part 3 as well as locations in the region of portion 4. In FIG. 3, profile (a) shows an idealized temperature profile for the case in which main part 3 has a consistent temperature which is higher than the temperature of portion 4. In FIG. 3, profile (c) shows a similar temperature profile for the case of a temperature gradient extending across the predetermined breaking point defined by the separation line 21. In FIG. 3, profiles (b) and (d) also show temperature profiles for the case of existing temperature gradients, here with temperature gradients extending completely within portion 4 or within main part 3. All temperature profiles (a) through (d) illustrated in FIG. 3 have in common that the average temperature in main part 3 is higher than the average temperature in portion 4. It is not important here, whether the glass element 2 was heated in the region of main part 3 or cooled in the region of portion 4, or whether both was performed simultaneously or with a time delay. What is important for the method of the invention is only that as a result of the generated temperature profile, glass element 2 expands in the region of main part 3 and/or contracts in the region of portion 4.

Figure 4A:
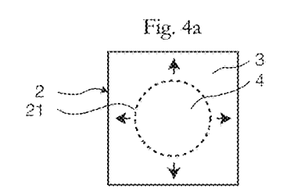
FIGS. 4a through 4h shows plan views schematically illustrating tensile stresses in a sheet glass element as produced by heating/cooling.
Figures 4B, 4E:
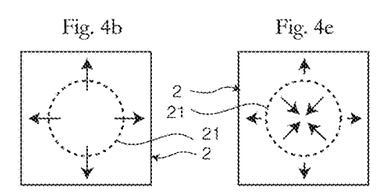
Figure 4C:
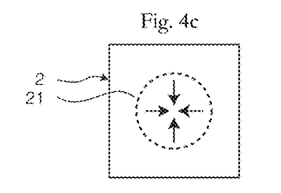
Figures 4D, 4G:
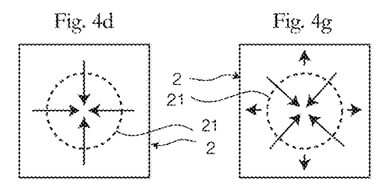
Figure 4F:
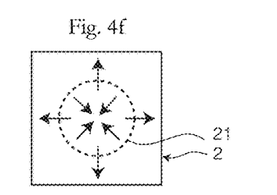
Figure 4H:
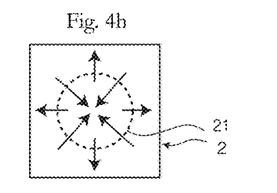

FIGS. 4a through 4h shows plan views of glass element 2 illustrating tensile stresses generated in glass element 2 by the heating and/or cooling according to the invention, that means for the case that no cleaving step has been performed. The tensile stresses are schematically illustrated by arrows. Assuming, that glass element 2 includes a series of filamentary damages aligned along separation line 21, which already have been introduced previously. FIG. 4a shows tensile stresses as a result of heating the glass element 2 in the region of main part 3 in accordance with a temperature profile (d) as illustrated in FIG. 3. FIG. 4b shows tensile stresses as a result of heating in the region of main part 3 in accordance with a temperature profile (c) as illustrated in FIG. 3. FIG. 4c shows tensile stresses as a result of cooling in the region of portion 4 in accordance with a temperature profile (b) as illustrated in FIG. 3. FIG. 4d shows tensile stresses as a result of cooling in the region of portion 4 in accordance with a temperature profile (c) as illustrated in FIG. 3. FIG. 4e shows tensile stresses as a result of heating in the region of main part 3 in accordance with a temperature profile (d) as illustrated in FIG. 3 with simultaneous or time-delayed cooling in the region of portion 4 in accordance with a temperature profile (b) as illustrated in FIG. 3. FIG. 4f shows tensile stresses as a result of heating in the region of main part 3 in accordance with a temperature profile (c) as illustrated in FIG. 3 with simultaneous or time-delayed cooling in the region of portion 4 in accordance with a temperature profile (b) as illustrated in FIG. 3. FIG. 4g shows tensile stresses as a result of heating in the region of main part 3 in accordance with a temperature profile (d) as illustrated in FIG. 3 with simultaneous or time-delayed cooling in the region of portion 4 in accordance with a temperature profile (c) as illustrated in FIG. 3. FIG. 4h shows tensile stresses as a result of heating in the region of main part 3 in accordance with a temperature profile (c) as illustrated in FIG. 3 with simultaneous or time-delayed cooling in the region of portion 4 in accordance with a temperature profile (c) as illustrated in FIG. 3.

All variants illustrated in FIGS. 4a-h for creating tensile stresses in glass element 2 by heating and/or cooling can cause the portion 4 to separate from the main part 3 along the separation line 21 at the adjacent filamentary damages.

Figure 5:
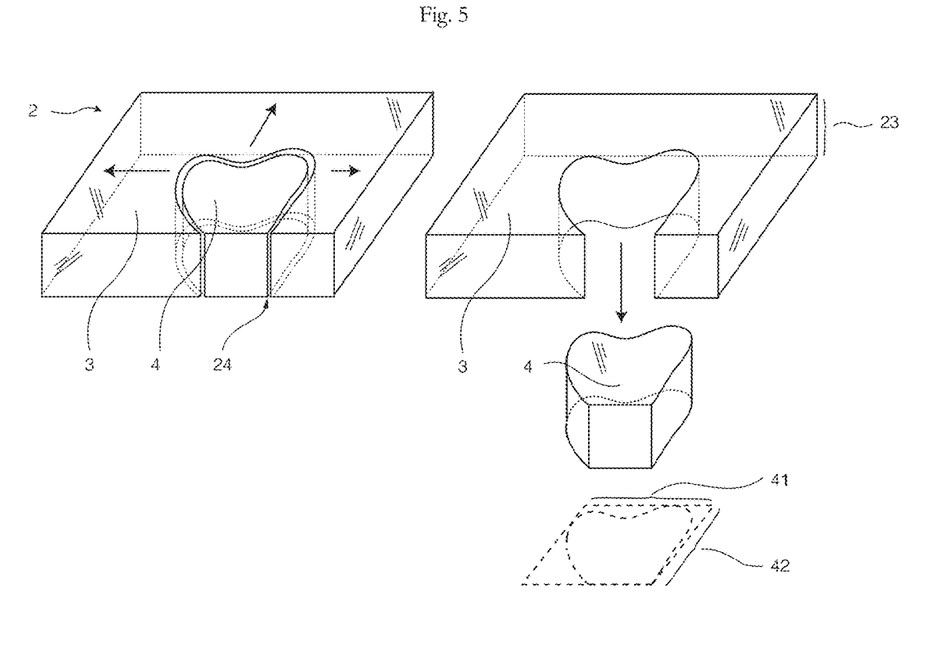
FIG. 5 is a schematic perspective view of a filamented glass element which has been heated in the region of the main part so that the portion can be removed.

FIG. 5 shows a schematic perspective view of a glass element 2 which was heated and caused to expand in the region of main part 3. Portion 4 of glass element 2 has detached from the main part 3 along the separation line at the adjacent filamentary damages. Therefore, portion 4 can be removed from main part 3.

As long as the main part 3 is still in a heated state, the removal of portion 4 is easily possible, i.e. in particular without jamming with the main part 3, and without deterioration or permanent deformation of portion 4. This is due to the fact that with the relative expansion of main part 3 relative to portion 4 not only separation along the separation line was cause but moreover a gap 24 has been formed between main part 3 and portion 4 along the course of the separation line. This gap provides a certain clearance which allows to remove the portion 4 from the main part 3 without jamming due to tilting.

While in separation processes employing the application of bending moments or local heating by laser radiation, for example by $CO_2$ lasers, growing difficulties are encountered with increasing thickness of the glass element 2, the inventive method allows to particularly easily remove the portion 4 even in the case of glass elements 2 that have a thickness 23 of at least 2 millimeters, preferably at least 3 millimeters, more preferably at least 4 millimeters, yet more preferably at least 5 millimeters.

The width of the gap formed by the heating in the region of main part 3 and/or the cooling in the region of portion 4 depends, inter alia, on the difference between the average temperatures that were generated between main part 3 and portion 4. However, the gap width also depends on the size of the surface area of the portion 4 along the two lateral dimensions 6 and 7. It is advantageous for the method of the invention that the portion 4 has certain minimum extensions along these two dimensions, in particular that the minimum extension of portion 4 in a first lateral dimension 6 and the minimum extension of portion 4 in a second lateral dimension 7 each have a minimum length. In one embodiment of the invention, this minimum length is 5 millimeters, preferably 10 millimeters, more preferably 20 millimeters.

Alternatively, however, it is also possible that the smallest rectangle enclosing portion 4 in the plane spanned by lateral dimensions 6 and 7 has side lengths 41 and 42 each having a certain minimum length. Then, both the maximum extension of portion 4 in a first lateral dimension 6 and the maximum extension of portion 4 in a second lateral dimension 7 each have a minimum length.

Figure 6A:
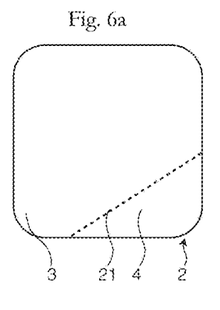
FIGS. 6a through 6f shows plan views schematically illustrating various forms of a separation line and of the corresponding main part and portion.
Figure 6B:
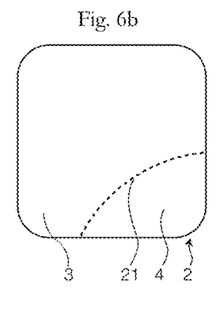
Figure 6C:
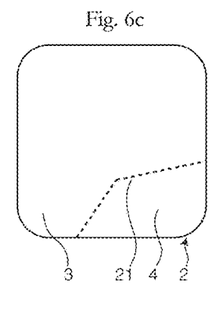

FIGS. 6a through 6f illustrates plan views of glass element 2 with different forms of a separation line 21 and corresponding main parts 3 and portions 4. A damage-free separation of portion 4 from main part 3, that means separation in such a way that both the main part 3 and the portion 4 experience no further damage except for the microperforation at the separation edge, is easily possible if the separation line 21 is rectilinear, as shown in FIG. 6a. In such a case, damage-free separation is possible using the inventive method, but it is also possible using conventional separation methods such as the application of a sufficient bending moment. This is similarly true for slightly curved or slightly angled separation lines 21 such as those shown in FIG. 6b and FIG. 6c, respectively.

Figure 6D:
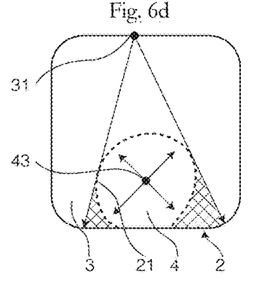
Figure 6E:
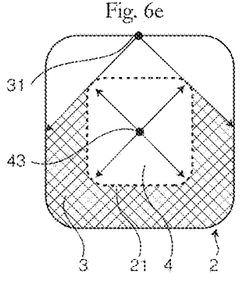

With common separation methods, difficulties will in particular be encountered if the separation line 21 is strongly curved or has strongly angled sections, i.e. if in the plane of glass element 2 the portion 4 can be referred to as a predominantly inner or completely inner portion, as is illustrated in FIG. 6d or FIG. 6e by way of example. By contrast, the method of the invention is very well suited for such cases.

FIG. 6d shows a case in which portion 4 is predominantly located in the interior of glass element 2. A criterion that can be applied for this case is that the two-dimensional shape of the main part 3 in the plane of glass element 2 is not star-shaped in the sense of mathematical topology. That is, within the two-dimensional area corresponding to main part 3 there is not a single point 31 which has the property of a star point. The indicated point 31 lacks the property of a star point, since it is not possible when starting from point 31 to draw straight lines to all other points within the two-dimensional area corresponding to main part 3, which lie entirely within this two-dimensional area. Therefore, when starting from point 31, the hatched areas of the surface area of main part 3 cannot be reached in the described manner. The area of main part 3 is therefore not star-shaped. The same applies to the area of main part 3 shown in FIG. 6e, which is neither star-shaped nor simply contiguous. Portion 4 is even completely located inside here, that is, it is completely enclosed in the plane of glass element 2. Such an inner portion 4 is sometimes also referred to as an inner contour or inner geometry.

For the method of the invention it is generally advantageous if the two-dimensional shape of portion 4 in the plane of glass element 2 is star-shaped, that means, if at least one star point 43 exists in the two-dimensional area corresponding to the portion 4. This is the case in the situations shown in FIG. 6d and FIG. 6e. Even any point of the area of portion 4 is a star point in the examples shown in FIG. 6d and FIG. 6e. In other words, the areas of portions 4 are even convex areas in these examples. For the separation it is advantageous when portions 4 represent convex areas in the plane of the sheet glass element 2. According to one embodiment of the invention it is therefore generally contemplated, without being limited to the illustrated examples, that portions are detached which have a two-dimensional shape of a convex area in the plane of the sheet glass element.

However, it is not absolutely necessary for the functioning of the method according to the invention that the shape of the portion is star-shaped or even convex in the plane of the glass. This is because the separation along the predetermined breaking point which extends along the separation line 21 tends to proceed once it has started in certain areas. In addition, uneven cooling and/or heating of the main part 3 and/or of the portion 4 may also promote the separation of non-star-shaped portions 4.

Figure 6F:
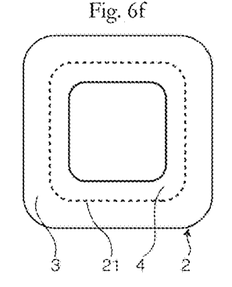

Another exemplary case in which neither the main part nor the portion 4 is star-shaped or convex in the plane of the glass is shown in FIG. 6f. Here, the two-dimensional area corresponding to the glass element 2 is neither star-shaped nor convex nor simply continuous. Such a glass element 2 which has a hole may for example be the result of a separation of an inner portion according to the invention, as shown in FIG. 6e. In this case, the separation line 21 has the shape of a closed loop. Mathematically, the portion 4 defined by separation line 21 is not an inner portion 4 anymore. However, it is not uncommon in practice, depending on the size of the hole, to speak of an inner geometry. The non-star-shaped and not simply contiguous portion 4 can be separated from the non-star-shaped and not simply contiguous main part 3 using the method of the invention without causing damage and without jamming.

Figure 7A:
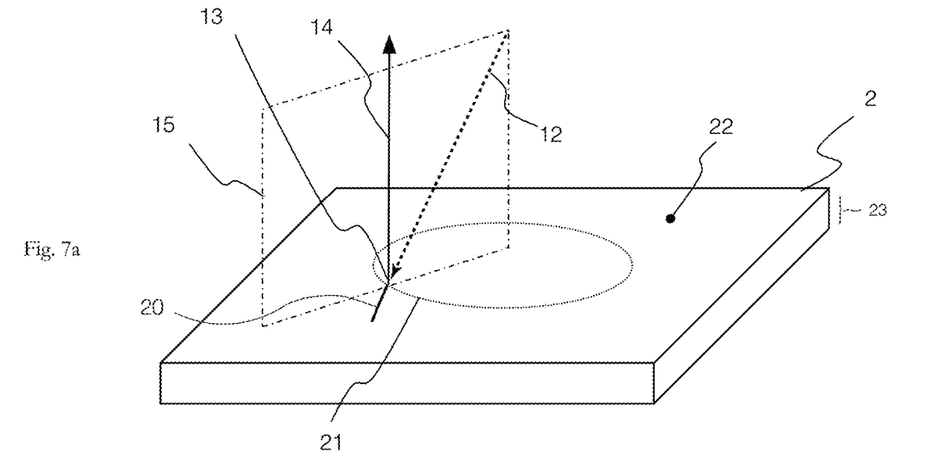
FIGS. 7a and 7b are schematic perspective views of an alternative laser processing device for producing oblique filamentary damages.

As can be seen from FIG. 7a, it is also possible according to one embodiment of the invention, to obliquely direct the laser pulses 12 onto the surface 22 of glass element 2, so that an angle exists between the surface normal 14 and the direction of laser pulses 12. Therefore, the longitudinal extension of the filamentary damages 20 will also extend obliquely to the surface 22. Moreover, the influence of refraction of the laser light on the surface 22 of glass element 2 has to be considered.

In order to facilitate the separation of the portion, the angle between the light incident direction and the surface normal 14 may be in a range from a few degrees to well over 10°. Preferably, an angle in a range from 3° to 30°, more preferably 3° to 15°, most preferably at least 5° is set between the light incident direction of the laser pulses 12 and the surface normal 14 of the surface 22 of glass element 2.

As can be seen from FIG. 7a, the laser pulses 12 are furthermore directed obliquely onto the surface 22 in such a way that the plane 15 of light incidence is transverse, preferably perpendicular to the separation line 21. Accordingly, the direction of advancement along which the point of incidence 13 is displaced over the surface 22 is also transverse, preferably perpendicular, to the light incidence plane 15. Light incidence plane 15 is spanned by the light incident direction and surface normal 14. If the separation line 21 is curved, for example circular, as in the example shown, the orientation of the separation line 21 transverse to the light incident plane 15 is to be understood as meaning that the tangent to the separation line 21 is transverse, preferably perpendicular, to the light incident plane 15.

Figure 7B:
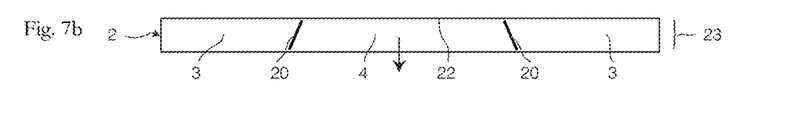

FIG. 7b shows a sectional view of glass element 2 corresponding to FIG. 7a. Due to the angle between the longitudinal extension of filamentary damages 20 and the surface normal 22, a preferred direction is resulting along which the portion 4 can be separated from the main part 3, as indicated by the arrow.

FIGS. 8a through 8h show sectional views illustrating glass elements in a view similar to FIG. 7b after a plurality of laser processing steps in different focal depths. That means, after a processing step in which damages 20 are produced in the volume of glass element 2 by laser pulses 12 of an ultrashort pulse laser by moving the points of incidence 13 of the laser pulses 12 on the glass element 2 over the surface 22 thereof along separation line 21, further processing steps are performed in which damages 20', 20", etc. are generated in similar manner, but with different focal depths of the laser pulses 12, in other depths in the volume of glass element 2.

Such multiple laser processing is particularly suitable for thicker glass elements 2, where it is often no longer possible or at least unfavorable to perform the microperforation over the entire thickness 23 in a single processing step or by displacing the point of incidence 13 of the laser beam 12 along the separation line 21 in only one pass.

A problem that may arise when repeatedly passing the laser beam in different focal depths is that the damages in different depths of the volume of glass element 2 will not be aligned ideally.

Figure 8A:
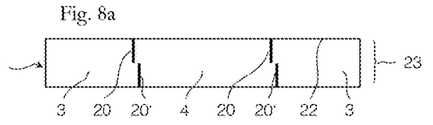
FIGS. 8a through 8h show schematic side views of glass elements after repeated laser processing.

FIG. 8a schematically illustrates, by way of example, a glass element 2 after two laser processing steps over the surface 22 thereof. Damages 20 were produced in a first processing step, while damages 20' were produced in a second step at a greater depth. Damages 20 and 20' have a certain offset from each other, which typically exhibits statistical variations due to finite positioning accuracy. This offset makes it difficult to separate portion 4 from main part 3 using the method according to the invention. Due to the offset, a roughness R' of the cut edge will result that is increased as compared to the roughness R caused by the filamentation.

According to a refinement of the invention it is contemplated to cause the offset between damages 20 and 20' in such a manner that only the roughness R caused by filamentation is relevant for a separation of portion 4 from main part 3, but not the roughness R' of the edge surface when taking into account the offset.

Figure 8B:
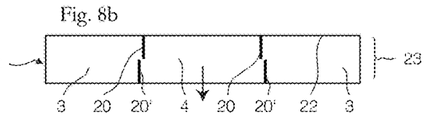

As illustrated in FIG. 8b, the damages 20' which are located deeper in the volume of glass element 2 with respect to surface 22, are produced in such a manner that the portion 4 is slightly larger on the face opposite to surface 22 than on the face of surface 22. Thereby, a preferred direction is resulting along which the portion 4 can be separated from the main part 3, as indicated by the arrow. Along this preferred direction, only the roughness R caused by the filamentation is decisive for the separation, while in the direction opposite to the preferred direction, the roughness R' additionally resulting from the offset between damages 20 and 20' is decisive for the separation. Portion 4 does not need to be a completely inner portion, rather, all forms mentioned above are eligible. In case the portion 4 is a circular inner portion, it will have a cake shape, figuratively speaking, due to the offset between damages 20 and 20'.

Figure 9A:
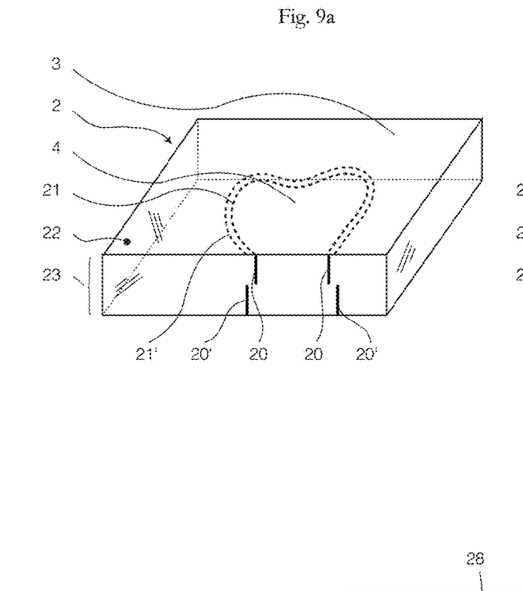
FIGS. 9a and 9b are perspective views of glass elements after repeated laser processing along a separation line and along additional offset lines.

While the damages 20 according to FIGS. 1a through 1d are generated by displacing the points of incidence 13 of the laser pulses 12 on the glass element 2 over the surface 22 thereof along separation line 21, the damages 20' according to FIG. 9a are generated by displacing the points of incidence 13 of the laser pulses 12 on the glass element 2 over the surface 22 thereof along an offset line 21' that is slightly spaced from separation line 21. The offset line advantageously extends completely on one side of the separation line 21, however it is not necessary, albeit advantageous, that the spacing between offset line 21' and separation line 21 is consistent along the lines.

Figure 8C:
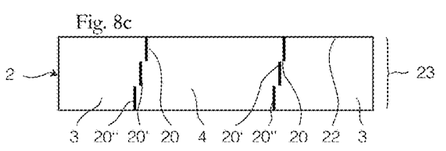
Figure 8D:
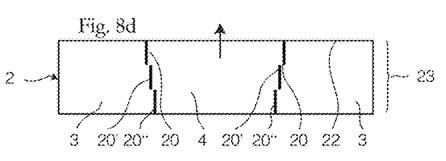

The described embodiment of the invention is not limited to two laser processing steps. It is also possible to perform three or even more passes with the laser. FIG. 8c schematically shows, by way of example, a sectional view through a glass element 2 after three laser processing steps which caused damages 20, 20', and 20". FIG. 8d in turn illustrates how the offsets between damages 20 and 20' and between damages 20' and 20" can be produced according to this embodiment of the invention in such a manner that a preferred direction is resulting for separating portion 4 from main part 3, as indicated by the arrow.

Figure 9B:
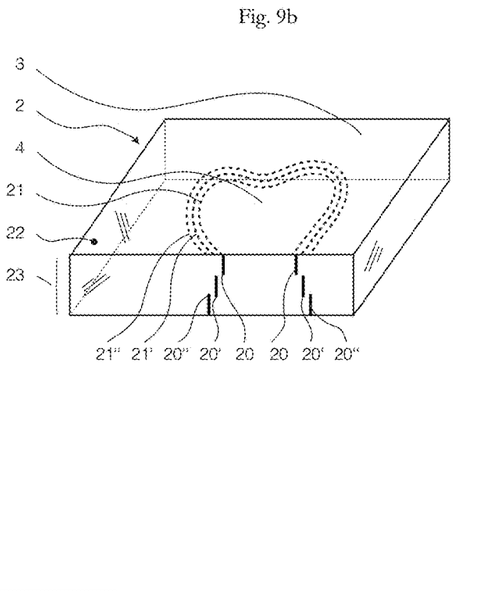

In this case, the damages 20' according to FIG. 9b have been produced by moving the points of incidence 13 of the laser pulses 12 on the glass element 2 over the surface 22 thereof along a first offset line 21' that is slightly spaced from separation line 21. Furthermore, damages 20" have been produced by moving the points of incidence 13 of the laser pulses 12 on the glass element 2 over the surface 22 thereof along a second offset line 21" that is spaced slightly further from separation line 21 than the first offset line 21'. Advantageously, the second offset line 21" extends completely on one side of the first offset line 21', however it is not necessary, albeit advantageous, that the spacing between the second offset line 21" and the first offset line 21' is consistent along the lines.

It is also possible to perform more than two laser processing steps. For this purpose, further offset lines can be defined which are again spaced slightly further from the separation line 21 and along which the points of incidence 13 of the laser pulses 12 are displaced over the surface 22 of glass element 2.

The selective controlling of one or more offset(s) between damages that are produced by multiple laser processing steps with different focal depths can be combined with the laser processing illustrated in FIGS. 7a and 7b according to which the laser pulses 12 are directed obliquely onto the surface 22 of glass element 2. In practice, it is usually not possible for the angle between the direction of light incidence and the surface normal 14 to be exactly set to zero degrees. Thus, strictly speaking, there will always be a (very) small angle, so that the longitudinal extensions of the damage channels will always be at a certain angle relative to the surface normal 14 of the glass element 2. Similarly to the positioning, a statistical deviation smaller than the alignment accuracy has to be assumed here.

Figure 8E:
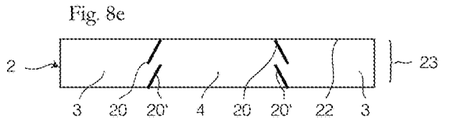

FIG. 8e shows oblique damages 20 and 20' caused by two laser processing steps on a glass element 2. Again, damages 20 and 20' are not exactly aligned (not exactly in one plane) but have a certain offset from each other. Again, this makes it difficult to separate the portion 4 from the main part 3 using the method according to the invention.

Figure 8F:
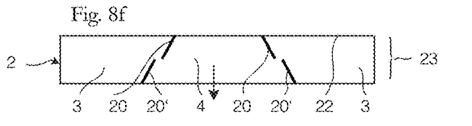

However, as shown in FIG. 8f, the offset can advantageously be adjusted such that the preferred direction for separation is resulting as indicated by the arrow. Along the preferred direction, portion 4 can be separated from main part 3 without any interfering effect by the edges that are caused by the offset.

Figure 8G:
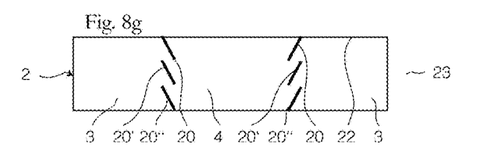
Figure 8H:
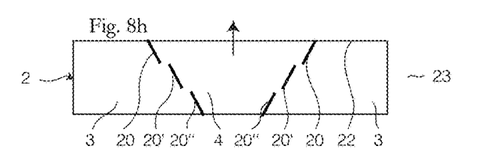

The described embodiment of the invention is not limited to two laser processing steps with laser pulses 12 obliquely impinging on the surface 22. It is also possible to perform three or more laser processing steps in different focal depths. FIG. 8g schematically illustrates, by way of example, a sectional view through a glass element 2 after three laser processing steps with laser pulses 12 that are obliquely directed onto the surface, resulting in damages 20, 20', and FIG. 8d shows how the offsets between damages 20 and 20' and between damages 20' and can again be arranged in this embodiment of the invention such that a preferred direction is resulting for separating portion 4 from main part 3, as indicated by the arrow. The offsets do not need to be equal in practice.

Figure 10A:
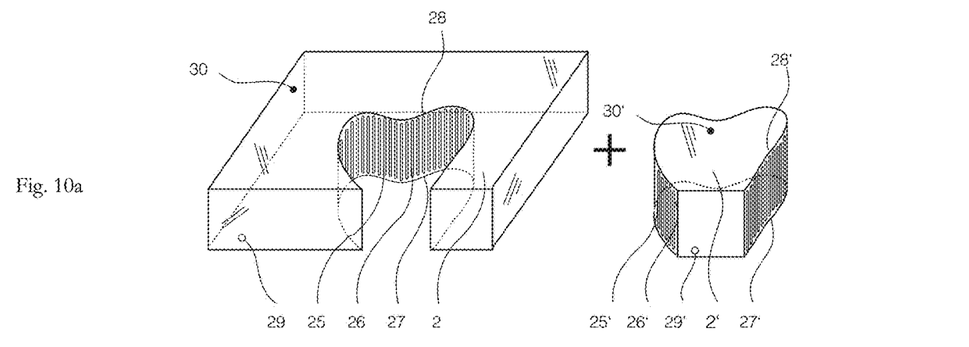
FIGS. 10a and 10b are schematic perspective views of sets of two respective sheet glass elements.
Figure 10B:
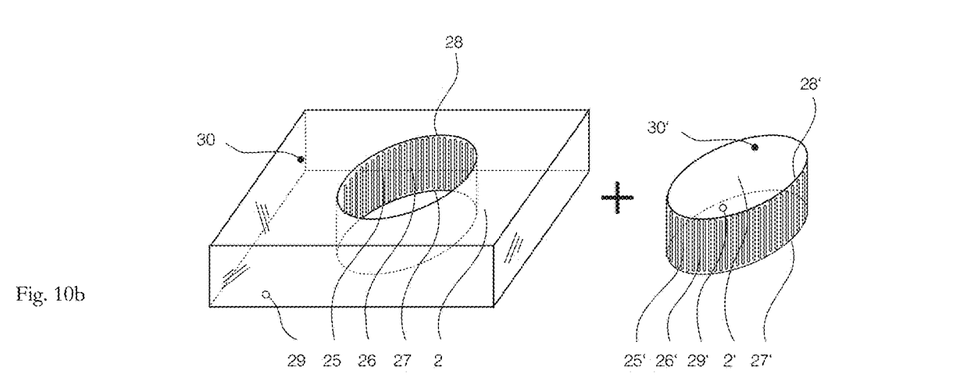

FIGS. 10a and 10b shows two sets each one consisting of two sheet glass elements which can be produced by the method of the invention. While the set of two sheet glass elements shown in FIG. 10b is formed so that the two-dimensional shape that one of the sheet glass elements 2 has in its plane completely encloses the two-dimensional shape the other one of the sheet glass elements 2' has in its plane, this is not the case for the set of two sheet glass elements shown in FIG. 10a. For the set shown in FIG. 10b this means that the glass element 2' is an inner portion fitting to glass element 2. For the set shown in FIG. 10a this means that the glass element 2' is a portion which fits to glass element 2 and which may be referred to herein as predominantly inner portion.

What applies to both illustrated sets (FIG. 10*a* and FIG. 10*b*) is that the one sheet glass element 2 could be combined with the other sheet glass element 2' with a perfect fit, at least theoretically.

Each sheet glass element 2 (or 2') of a set has an edge surface 25 (or 25') which has adjacently aligned filamentary damages 26 (or 26') forming indentations in this edge surface (or 25'). These filamentary damages can be caused by a microperforating laser processing process according to the method of the invention.

The longitudinal extension of the filamentary damages 26 (or 26') in an edge surface 25 (or 25') of a sheet glass element of a set of two glass sheet elements extends in the direction from one edge to the other edge which define the transition between the edge surface 25 (or 25') and the faces 29 (or 29') and 30 (or 30') of the glass element. When a glass element 2 (or 2') of a set of two glass elements is produced by the method according to the invention, this longitudinal extension of the filamentary damages 26 (or 26') corresponds to the direction of light propagation of the laser pulses.

If the two sheet glass elements 2 and 2' of a set would be combined in perfect fitting manner, the edge surfaces 25 and 25' of glass elements 2 and 2' would touch one another or would come very close to each other. Also, the edges 27 and 27' would touch one another or would come very close to each other, and edges 28 and 28' would also touch one another or would come very close to each other. The two-dimensional surfaces in the planes of sheet glass elements 2 and 2' would fit together like two puzzle pieces when the two glass elements 2 and 2' are joined.

The two sheet glass elements of a set are preferably originating from the same separation process. That means, by applying the method of the invention, an original sheet glass element was divided into a main part and a portion, which when taken together form a set of sheet glass elements according to the invention. If the two sheet glass elements of a set originate from the same process, a highest possible accuracy of fit is guaranteed, which is even higher than if a series of portions equivalent to each other were produced by a number of equivalent separation processes and a series of main parts equivalent to each other were produced by a number of equivalent separation processes and a set of sheet glass elements according to the invention would be chosen to consist of any portion of the series of portions and any main part of the series of main parts.

Figure 11A:
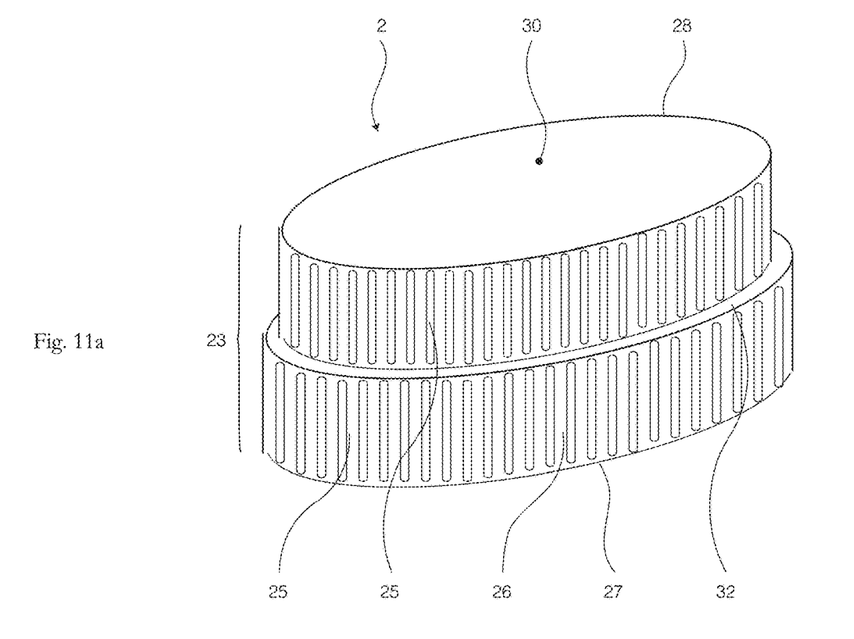
FIGS. 11a and 11b are schematic perspective views of sheet glass elements with offset(s) in the edge surface.
Figure 11B:
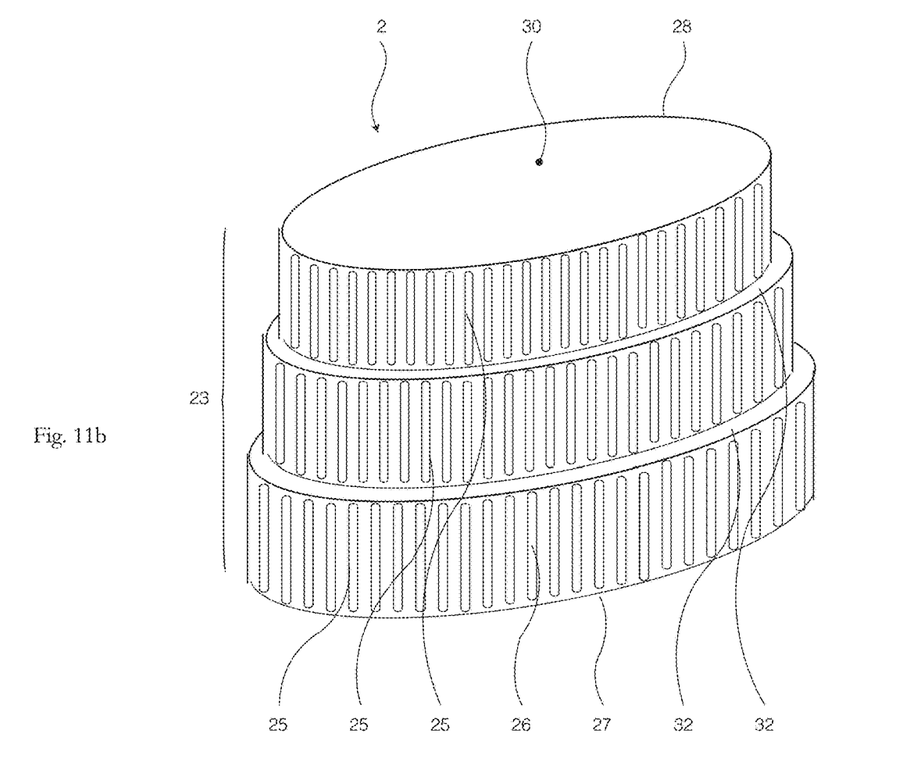

According to one further embodiment of the invention it is contemplated that each sheet glass element 2 (or 2') of a set of two sheet glass elements has an edge surface 25 (or 25') which exhibits at least one offset 32 (or 32'), i.e. a step, that extends transversely, preferably substantially perpendicular to the longitudinal extension of the adjacently aligned filamentary damages 26 (or 26'). FIGS. 11*a* and 11*b* show illustrations of such sheet glass elements 2.

The at least one offset 32 (or 32') may result in a roughness R' of the edge surface 25 (or 25') which is increased compared to the roughness R as caused by the filamentary damages 26 (or 26').

The at least one offset is a step that is imperceptible to the naked eye, so that it is still possible to speak of a single edge surface 25 (or 25'). Preferably, the at least one offset is a step of at least 5 micrometers and at most 50 micrometers.

FIG. 11*a* shows a sheet glass element 2 according to the invention, which is distinguished by an edge surface 25 having adjacently aligned filamentary damages 26 forming indentations in the edge surface 25, wherein a longitudinal extension of the filamentary damages 26 extends in the direction from one edge 27 to the other edge 28, which edges define the transition between the edge surface 25 and the faces 30 of sheet glass element 2, and wherein the edge surface 25 has an offset 32 extending along the entire edge surface 25 and extending substantially perpendicular to the longitudinal extension of the filamentary damages 26. The offset preferably extends in the middle of the edge surface, with a deviation of 20 percent, that is in the middle between edges 27 and 28 with a deviation of 20 percent.

FIG. 11*b* shows another sheet glass element 2 according to the invention, which is distinguished by an edge surface 25 that has two offsets 32 extending along the entire edge surface 25 and extending substantially perpendicular to the longitudinal extension of the filamentary damages 26. The two offsets preferably extend with a spacing from the surface 30 of glass element 2 of one third and two thirds, respectively, of the width 23 of edge surface 25, with a deviation of 20 percent.

LIST OF REFERENCE NUMERALS

| | |
|---|---|
| 1 | Laser processing device |
| 10 | Ultrashort pulse laser |
| 11 | Focusing means |
| 12 | Laser pulse |
| 13 | Points of incidence of the laser pulses on the glass element |
| 14 | Surface normal of glass element |
| 15 | Light incidence plane of the laser pulses |
| 2 | Sheet glass element |
| 2' | Sheet glass element |
| 20, 20', 20" | Filamentary damages |
| 21, 21', 21" | Separation line |
| 22 | Surface of glass element |
| 23 | Thickness of glass element |
| 24 | Gap between the portion and the main part |
| 25 | Edge surface with adjacently aligned filamentary damages |
| 25' | Edge surface with adjacently aligned filamentary damages |
| 26 | Filamentary damages in an edge surface |
| 26' | Filamentary damages in an edge surface |
| 27, 28 | Edges of a sheet glass element defining the transition between the faces and an edge surface connecting these faces |
| 27', 28' | Edges of a sheet glass element defining the transition between the faces and an edge surface connecting these faces |
| 29, 30 | Faces of a sheet glass element |
| 29', 30' | Faces of a sheet glass element |
| 32 | Offset in an edge surface |
| 3 | Main part |
| 31 | Point within the two-dimensional area corresponding to the main part |
| 4 | Portion to be separated |
| 41 | Maximum extension of the portion along the first lateral dimension |
| 42 | Maximum extension of the portion along the second lateral dimension |
| 43 | Point within the two-dimensional area corresponding to the portion |
| 5 | Heating device |
| 50 | Heating zone |
| 6 | First lateral dimension of glass element |
| 7 | Second lateral dimension of glass element |

What is claimed is:

1. A method for separating a portion from a sheet glass element, the method comprising:
producing filamentary damages in a volume of the sheet glass element adjacently aligned along a non-rectilinear separation line, the non-rectilinear separation line dividing the sheet glass element into the portion and a remaining main part; and causing thermal expansion and contraction to cause the portion and the remaining main part to change size differently from each other to produce local tensile stresses sufficient to cause the portion to detach from the main part along the non-rectilinear separation line without a cleaving step, wherein the portion and the remaining main part each remain intact as separate wholes, wherein the material of the sheet glass element has a coefficient of thermal expansion that is greater than $3 \times 10^{-6}$ K$^{-1}$:

wherein the step of causing thermal contraction comprises cooling a region of the portion, wherein the step of producing the filamentary damages comprises:

generating a plasma within the volume with laser pulses of an ultrashort pulse laser, wherein the sheet glass element comprises a material that is transparent to the laser pulses, and displacing points of incidence of the laser pulses over a surface of the sheet glass element along the non-rectilinear separation line.

2. The method as in claim 1, wherein the step of causing thermal expansion comprises heating a region of the remaining main part.

3. The method as in claim 2, further comprising thermally toughening the remaining main part exploiting heat from the heating step.

4. The method as in claim 1, further comprising, after producing the filamentary damages, causing crack formation between adjacent filamentary damages by displacing laser radiation on the sheet glass element along the non-rectilinear separation line so as to cause the local tensile stresses in the glass along the non-rectilinear separation line.

5. The method as in claim 1, wherein the step of causing thermal expansion and/or contraction comprises producing a temperature difference between an average temperature of the remaining main part and an average temperature of the portion that is at least 150 degrees Celsius.

6. The method as in claim 1, wherein the sheet glass element has a thickness of at least 2 millimeters.

7. The method as in claim 1, wherein the sheet glass element has a thickness of at least 3 millimeters.

8. The method as in claim 1, wherein the portion has a first minimum extension of at least 5 millimeters along a first lateral dimension and a second minimum extension of at least 5 millimeters along a second lateral dimension that is orthogonal to the first lateral dimension.

9. The method as in claim 1, wherein the non-rectilinear separation line is configured so that the remaining main part has a two-dimensional shape that is not star-shaped in a sense of mathematical topology in a plane of the sheet glass element.

10. The method as in claim 1, wherein the non-rectilinear separation line is configured so that the remaining main part completely encloses the portion in a plane of the sheet glass element.

11. The method as in claim 1, further comprising producing secondary filamentary damages in the volume of the sheet glass element adjacently aligned along an offset line which is spaced from the non-rectilinear separation line by at least 5 and at most 50 micrometers.

12. The method as in claim 11, further comprising a projection of the secondary filamentary damages onto a longitudinal extension of the filamentary damages exhibit an overlap of less than 200 micrometers.

13. The method as in claim 1, wherein the step of generating the plasma within the volume with the laser pulses comprises directing the laser pulses obliquely on the surface so that the laser pulses have a light propagation direction that extends obliquely relative to the surface and so that the filamentary damages resulting from the laser pulses have the longitudinal extension that extends obliquely relative to the surface, wherein the non-rectilinear separation line extends obliquely to a light incidence plane of the laser pulses.

14. A method for separating a portion from a sheet glass element, the method comprising:

producing filamentary damages in a volume of the sheet glass element adjacently aligned along a non-rectilinear separation line, the non-rectilinear separation line dividing the sheet glass element into the portion and a remaining main part; and causing thermal expansion and contraction to cause the portion and the remaining main part to change size differently from each other to produce local tensile stresses sufficient to cause the portion to detach from the main part along the non-rectilinear separation line without a cleaving step, wherein the portion and the remaining main part each remain intact as separate wholes, wherein the step of causing thermal contraction comprises cooling a region of the portion, wherein the step of producing the filamentary damages comprises:

generating a plasma within the volume with laser pulses of an ultrashort pulse laser, wherein the sheet glass element comprises a material that is transparent to the laser pulses, and displacing points of incidence of the laser pulses over a surface of the sheet glass element along the separation line:

wherein the step of causing thermal expansion comprises heating a region of the remaining main part, and wherein the method further comprises the steps of coordinating an adjustment of L, $\Delta T$, and a such that a minimal gap width (S) between the portion and the remaining main part is greater than a mean roughness (R), wherein L is a minimum extension of the portion in a plane of the sheet glass element, $\Delta T$ is a temperature difference in Kelvin between an average temperature of the remaining main part and an average temperature of the portion during the heating and cooling step, $\alpha$ is a coefficient of thermal expansion of the material of the sheet glass element, and R is an average roughness of an edge surface of the portion along which the portion separates from the remaining main part.

15. The method as in claim 14, further comprising satisfying an inequation $L \cdot \Delta T \cdot \alpha > R$.

* * * * *